Sept. 2, 1958        A. N. STANTON        2,850,652
CONDUCTIVE FLUID TYPE ELECTROMAGNETIC DEVICE
Filed Dec. 11, 1953        3 Sheets-Sheet 1
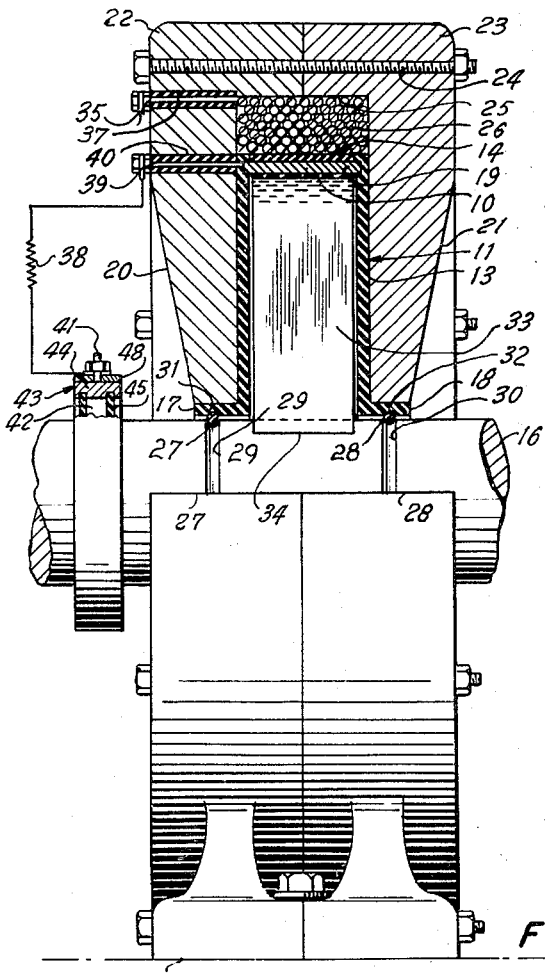
Fig. 1
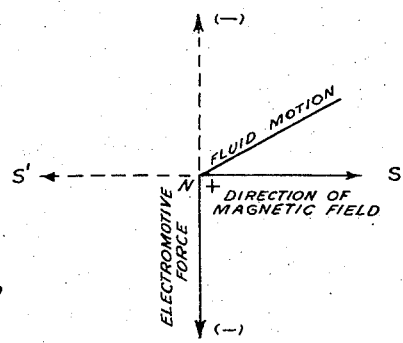
Fig. 1-A
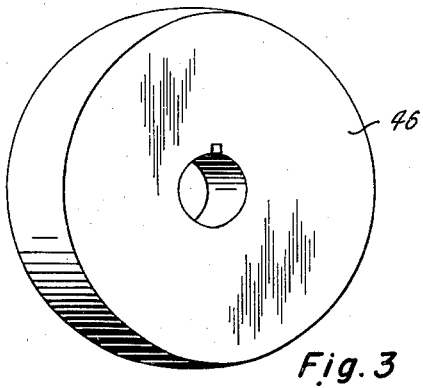
Fig. 3
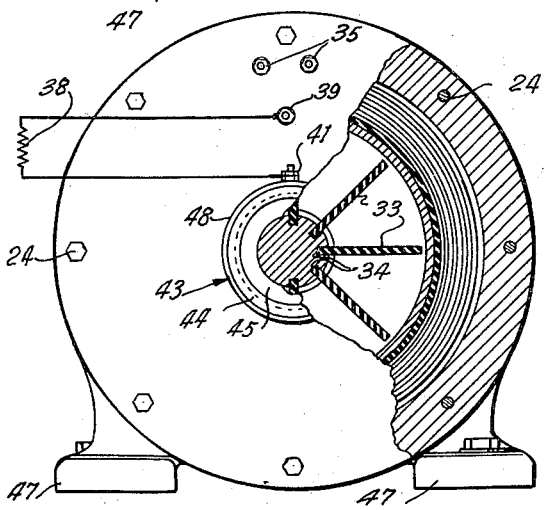
Fig. 2
INVENTOR
AUSTIN N. STANTON
BY
ATTORNEY Sept. 2, 1958 A. N. STANTON 2,850,652
CONDUCTIVE FLUID TYPE ELECTROMAGNETIC DEVICE
Filed Dec. 11, 1953 3 Sheets-Sheet 2
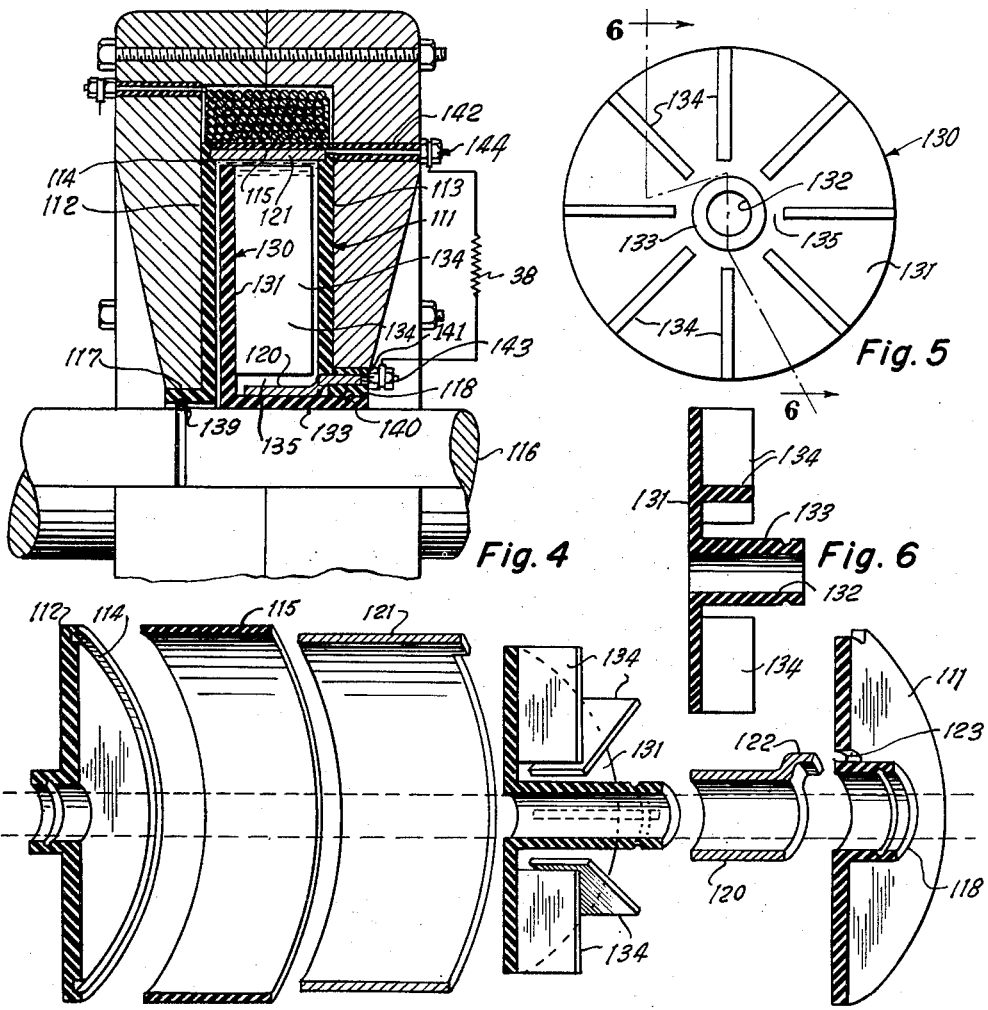
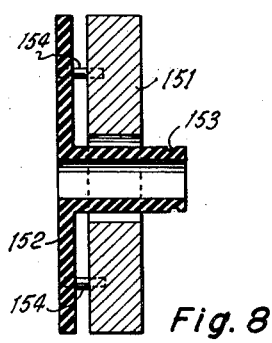
INVENTOR
AUSTIN N. STANTON
BY
ATTORNEY Sept. 2, 1958 A. N. STANTON 2,850,652
CONDUCTIVE FLUID TYPE ELECTROMAGNETIC DEVICE
Filed Dec. 11, 1953 3 Sheets-Sheet 3
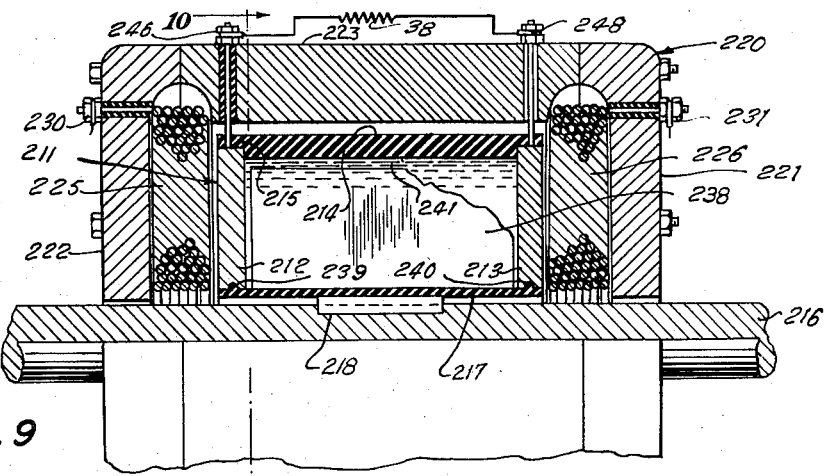
Fig. 9
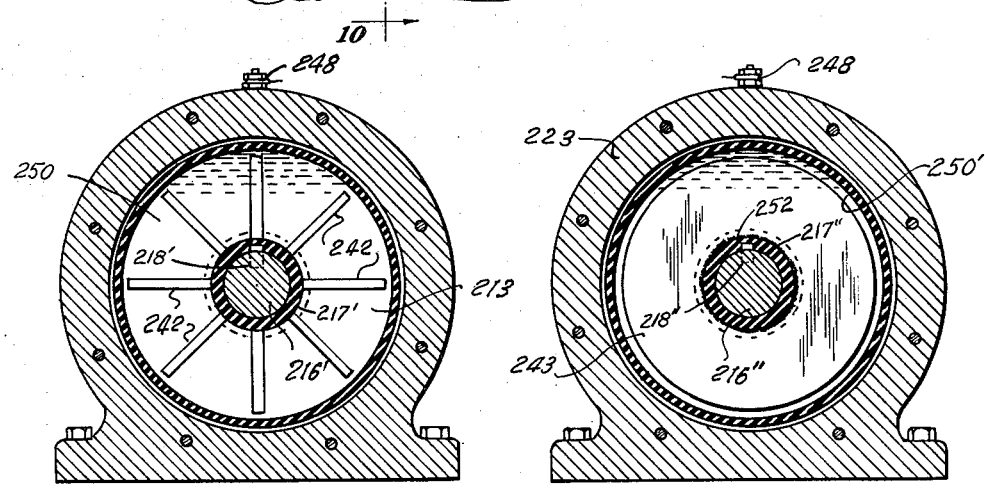
Fig. 10 Fig. 11
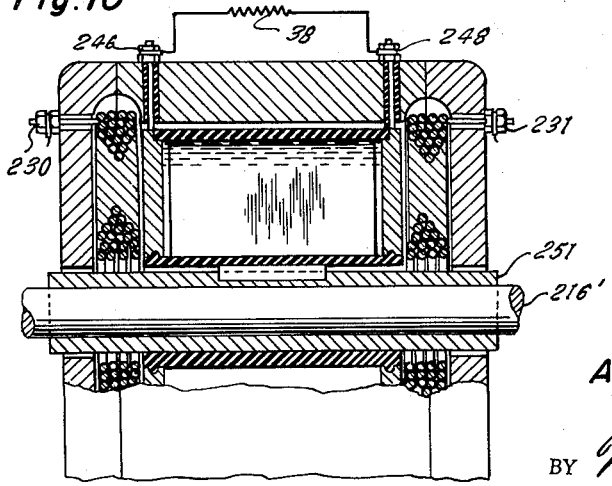
Fig. 12
INVENTOR
AUSTIN N. STANTON
BY
ATTORNEY United States Patent Office 2,850,652
Patented Sept. 2, 1958

2,850,652
CONDUCTIVE FLUID TYPE ELECTROMAGNETIC DEVICE

Austin N. Stanton, Garland, Tex.

Application December 11, 1953, Serial No. 397,612

6 Claims. (Cl. 310—11)

This invention relates to new and improved electromagnetic devices, and more particularly to new and improved electromagnetic devices utilizing electrically conductive fluids.

The behavior of an electrically conductive fluid medium having relative motion with respect to a magnetic field is analogous in a restricted sense to that of an electrically conductive solid medium under the same conditions. It is well known that if an electric current is caused to flow in a solid conductor by suitable external circuitry and the conductor is placed in a magnetic field in such a manner as to have the current flow in a direction which is, or has a component thereof, perpendicular to the direction of the magnetic lines of force constituting the magnetic field, the solid conductor will be physically urged to move in a direction perpendicular to both the direction of the current within the conductor and the direction in which the lines of force of the magnetic field extend. This reaction is commonly known as "motor action" and is the basis of the well known electromagnetic conductive fluid pump.

In the conductive fluid pump a duct or conduit containing an electrically conductive fluid medium, such as mercury as an example, replaces the solid conductive medium. However, since in most pumping applications it is desired to move or pump the fluid longitudinally within the duct or conduit, the longitudinal axis of the duct or conduit is positioned in the magnetic field so that it extends in the direction in which the solid conductor of the above example of "motor action" was caused to move. An external source voltage is applied by means of electrodes in the side walls of the duct or conduit to cause an electric current to flow through the conductive fluid transversely of the longitudinal axis of the duct or conduit. With the above conditions met, the fluid is caused to flow longitudinally of the duct or conduit.

Thus it is seen that a conductive fluid responds to the same magnetically derived forces as a solid conductor. The manner in which the conductive fluid responds to these forces differs due to the unlike physical characteristics of the two media. The fluid having the property of fluid mobility is caused to flow in the manner typical of fluids while the solid conductor moves as a whole, retaining its original physical dimensions. This peculiar property of conductive fluid in the presence of a magnetic field has been advantageously utilized in systems involving electromagnetic generation of electrical energy.

In such systems, as is well known, means for producing the magnetic field and an inductor moving perpendicularly through the magnetic field are supplied to yield a generated or induced electromagnetic force in the inductor in a direction perpendicular to both the direction of the magnetic field and the direction in which the inductor is moved.

The inductor means in an electrically conductive fluid type generator is a moving stream of conductive fluid. The electromotive force generated in the fluid is, of course, in a direction perpendicular to the flow of the fluid.

Hitherto, the design of conductive fluid type generators has always been deficient with respect to the means for propelling the conductive fluid through the magnetic field, and the means for extracting the induced energy from the fluid for application to an external load. Previous attempts to overcome the first of these deficiencies have always required a separate external pumping system, while the search for more efficient means of extracting the induced energy has involved the use of solid type rotary contacts where rotary generators were involved. The use of solid rotary type contacts has been unsatisfactory because of their inherent tendency to spark in the presence of high current demands.

It is an object of the present invention to provide novel structural arrangement for propelling fluid in conductive fluid type electromagnetic devices.

It is another object of the present invention to provide an electrically conductive fluid type electromagnetic device wherein the means for propelling the fluid is integrally related to the device.

It is another object of the present invention to provide an electrically conductive fluid type electromagnetic device comprising novel structural arrangements for conveying electrical energy to and from fixed terminals to moving parts thereof.

It is another object of the present invention to provide a generator whose output frequency is independent of speed of rotation of the inductor thereof.

These objects and others which will become apparent from the following description of the invention taken in conjunction with the drawings in which:

Figure 1 is partly a cross-sectional and partly a schematic view of one form of the invention;

Figure 1A is an electrical sector diagram representing the electrical forces of the device of Figure 1;

Figure 2 is an elevation, with some parts broken away;

Figure 3 is a perspective view of an alternative member for use in the device of Figure 1;

Figure 4 is a cross-sectional view of a modified form of the device shown in Figure 1;

Figure 5 is a sectional view of the propeller assembly of Figure 4;

Figure 6 is a sectional view along lines VI—VI of Figure 5;

Figure 7 is an exploded perspective view of various members of Figure 4;

Figure 8 is a sectional view of an alternative member for use in the device of Figure 4;

Figure 9 is a sectional view of another modification of the device of Figure 1;

Figure 10 is an embodiment of the device of Figure 9;

Figure 11 is another embodiment of the device of Figure 9; and,

Figure 12 is still another embodiment of the device of Figure 9.

While the subsequent detailed description of the various modifications of this invention shall initially be in terms of their operation as electric generators, it is to be understood that each modification is also capable of operating as an electric motor as will be more fully described later.

Referring particularly to Figure 1, one embodiment of my improved electrically conductive fluid type device adapted for operation as an electric generator comprises a hollow annular member 11 in which a conductive fluid medium 10, such as mercury, liquid sodium-potassium alloys or other of the well known fluid conductive materials, is constrained, as will be more completely described below. In detail the hollow annular member 11 is defined by two disc-like side walls 12 and 13, outer annular wall 14 and a conductive ring 32. Side walls 12 and 13 have annular grooves adjacent their outer edges which receive the edges of the conductive ring 19. The outer wall 14 is dimensioned to tightly engage the outer surface of ring 19 and is bonded at its edges to the protruding edges of walls 12 and 13. The member 11 is centrally apertured at 15 for disposition of the member on a rotatable drive shaft 16. The central aperture is further defined by two annular laterally and oppositely extending flanges 17 and 18 which are joined to or integral with the respective side walls 12 and 13. The various parts of member 11 except for ring 19 are formed of suitable insulating material for reasons which will be included in the description of the generators mode of operation. The parts of member 11 formed of insulating material do not necessarily have to be rigid but may have appreciable flexibility.

The outer portion of member 11 is enclosed by and in firm engagement with a magnetic structure which produces the required magnetic field. For direct current operation this structure comprises two annular magnetic pole pieces 20 and 21 which have opposed peripheral flanges 22 and 23, respectively. The pole pieces, when held in close assembled relationship by means of a plurality of bolts or rivets 24, define an inner cavity 25 which houses in tight engagement member 11. If alternating current operation is desired, the structure defined by pole pieces 20 and 21 can be formed as a unitary laminated structure, a practice well known in the art for reducing eddy currents within magnetic material. Also housed in the cavity 25 is an electromagnetic coil 26 which with member 11 completely fills the cavity 25. The coil 26 is annular in shape and is disposed at the base of the annular cavity between the pole pieces 20 and 21. It is important to the efficient operation of the generator that minimum dimensions be maintained transversely of cavity 25, which minimum dimensions are partly obtained by the provision of a tight fit between the pole pieces and member 11. The thickness of the member 11 is minimized by making the walls 12 and 13 thin and by restricting the spacing between walls. The spacing between the walls is governed by the minimum cross-sectional fluid area required to establish an electrical resistance through the fluid sufficiently low as not to unfavorably affect the internal impedance characteristics of the generator.

Shaft 16, which rotates relative to the fixed annular member 11 and its associated magnetic structure which comprises the coil 26 and pole pieces 20 and 21, or its equivalent laminated structure for alternating current operation is maintained in sealed and insulated relation to member 11 by means of pressure contact between the sealing rings 27 and 28 carried in the shaft grooves 29 and 30 and the grooves 31 and 32 on the inner surface of flanges 17 and 18. The sealing rings 27 and 28 may be formed of self-lubricating insulating materials which are not affected by frictional heat resulting from the sliding contact between the rings and flanges 17 and 18. Silicone rubbers, polytetrafluoroethylene and polymonochlorotrifluoroethylene are examples of suitable materials.

Paddles 33, which propel the conductive fluid circumferentially about shaft 16 within annular member 11, are secured to shaft 16 by means of keyways 34 in the shaft which receive the inner ends of the paddles. The paddles 33 are so dimensioned as to have an intimate sliding contact with the side walls 12 and 13 and the inner surface of ring 19 to assure adequate propulsion of fluid and to substantially divide the fluid into individual segments to minimize the circulating currents likely with alternating current operation.

Field coil 26 is energized by the application of an alternating current or direct current source, depending upon the mode of operation desired, to terminals 35 which are electrically connected to the coil leads by insulated conductors passing through apertures 37 in pole piece 20.

The output of the generator for application to an external load 38 is derived from terminal 39 which is connected by an insulated conductor through aperture 40 in pole piece 20 to portions of conductive collector ring 19 extending through the side of wall 12 of member 11; and terminal 41 which is electrically connected to a conventional rotary brush means or to the conductive fluid medium 42 constrained within a hollow annular seal 43 comprising a conductive annular outer wall 44 comprising two half ring members of which one half ring member is integral with terminal 41, insulating rings 45 and the surface of the shaft 16. The various parts of the seal 43 are held in assembled relation by the outer ring 48. The shaft 16 which also serves as a current collector is made of a non-magnetic material having satisfactory conductivity, such as copper, or may be made of a non-magnetic material which is plated on the outer surface with material having high conductivity, such as copper or silver.

In the generator of Figure 1 an induced electromotive force is caused to appear across the conductive fluid conductor 10 between terminal ring 19 and the shaft 16 by the movement of the conductive fluid 10 through the magnetic field existing between poles 20 and 21. This induced electromotive force or voltage, as indicated in the three dimensional diagram of Figure 1A, is in a direction perpendicular to both the direction of the magnetic field and the direction in which the conductive fluid is propelled through the magnetic field.

It is apparent from the diagram of Figure 1A that for direct current operation the directional relationship of magnetic field, inductor motion and generated electromotive force are shown by the solid vectors. If the direction of fluid motion is maintained the same and the polarity of the direct current excitation voltage is reversed, thus reversing the direction of the magnetic field, the magnetic field and the generated voltage would be reversed as shown by the dashed vectors. It then follows that the output voltage of the generator will be alternating current if an alternating current is applied to the exciting coil 26. Moreover, the frequency of the alternating current output will be governed solely by the frequency applied to the exciting coil 26 and will not be affected by changes in velocity of the fluid.

Obviously all parts of member 11 except the conductive ring 19 must be made of insulating materials to prevent short circuiting of the induced voltage through the side walls 12 and 13 and also through the magnetic structure.

Figure 3 shows a solid copper disk 46 which can be substituted for the paddle assembly and the portion of the conductive fluid serving as the inductor in the device shown in Figure 1. The disk 46 is so dimensioned as not to contact either the ring 19 or sidewall 12 and 13. The remaining space within member 11 is filled with conducting fluid which serves as a fluid brush to electrically connect the periphery of disk 46 to ring 19.

Figure 2 shows mounting lugs 47 suitably secured to the magnetic structure.

Figure 4 shows a generator which differs from that of Figure 1 in the structural arrangements for propelling the conductive fluid and for conveying the induced energy from the fluid to the output terminals. These structural arrangements are embodied in the cooperative integration of the propeller means 130, the conductive fluid constraining member 111, and the current collecting rings 120 and 121.

The propeller 130 shown in Figures 5 and 6 consists of a disc 131 having a central aperture 132, an annular sleeve 133 having a bore the same size as the aperture 132 extending laterally from one side of the disc coaxially of the aperture 132, and a plurality of paddle members 134 extending laterally from the same side of the disc as the sleeve 133 and also extending radially inwardly from the outer periphery of disc 131 to a point such as to provide a clearance 135 between the inner end of each paddle and the outer surface of sleeve 133.

The conductive fluid constraining assembly 111 which also embodies the current collecting rings 120 and 121 comprises a first disk 112 having a central aperture which is laterally extended by an annular flange 117, a second disk 113 having a central aperture which is laterally extended by an annular flange 118. The outer peripheries of disks 112 and 113 are joined by the annular current collector ring 121 which is received in the recesses 114 and the annular member 115 which is bonded at its edges to members 112 and 113. The inner current collector ring 120 is of such width as to provide clearance between one edge and the inner surface of disk 112 and is connected to disk 113 by means of tabs 122 which are received in openings 123 adjacent the outer surface of flange 118.

The conductive fluid constraining assembly 111 and the propeller member 131 are assembled on the shaft in the manner clearly shown in the explosion view in Figure 7. The seal 139, which is identical to the seals of Figure 1, is provided between the shaft and flange 117. The flange 118 is sealed to the sleeve 133 by means of a similar seal comprising opposed grooves in flange 118 and sleeve 133 which receive a ring member 140 also similar to the sealing rings employed in Figure 1. As shown in Figure 4, the paddles 134 and sleeve 133 of the propeller 131 fit in dove-tail relation over the inner current collector ring 120. The sleeve 133 is keyed to shaft 116 by means of a tight fit between the sleeve and the shaft of which one or both may be scored. Close sliding contact is maintained between adjacent surfaces of the propeller assembly and the fluid constraining assembly 111 to insure maximum circulation of the conductive fluid filling the assembly 111. This modification also has mounting lugs, not shown, similar to 47 in Figure 2.

With this arrangement of parts it becomes apparent that the conductive fluid serves both as an inductor and as brush contact means. It is then possible with this modification of the generator to electrically connect the stationary current collector rings 122 and 121 by means of insulated leads 141 and 142, respectively, to the terminals 143 and 144 for application of the general energy to load 150. This modification, obviously, can be operated either as an A. C. or D. C. machine with the same structural and electrical provisions described in connection with Figure 1.

Figure 8 shows a solid inductor assembly which can be substituted for the fluid propeller and the portion of the fluid serving as an inductor in the device of Figure 4. The copper disk 151 is dimensioned to provide a small clearance between its exposed surfaces and the adjacent inner surfaces of member 111. The disk 151 is mounted by means of securing rivets or screws 154 on an insulating disk 152 having a central aperture which is laterally extended by a sleeve 153 of the same configuration as sleeve 133 of Figure 4. The device of Figure 4 as modified by the structure of Figure 8 operates in the same fashion as the device of Figure 1 incorporated with the structure of Figure 3.

The device shown in Figure 9 also has the advantage of non-rotary contacts. However, in this modification a radial magnetic field pattern is utilized. In this modification the conductive fluid constraining member 211 comprises an annular outer wall 214 of insulating material which is bonded at recessed edges 215 to the peripheral edges of disk-like current collectors 212 and 213. The periphery of the central apertures of collectors 212 and 213 are grooved to receive seals 239 and 240 consisting of raised annular rings on the cylindrical insulating sleeve 217 which is fixed to rotating shaft 216 by means of key 218. The member 211 is maintained in fixed relationship to the nonrotating magnetic structure 220 and the excitation coils 225 and 226 by means of output terminal studs 246 and 248 which are insulated in the regions thereof passing through the coils 225 and 226 and the magnetic structure 220. The terminal studs are suitably joined to the collectors 212 and 213 by means of threaded or welded connections. The magnetic core structure consists of centrally apertured and peripherally flanged disk-like end members 221 and 222 which may be made of any desired magnetic stock, soft iron cylinder 223, and the shaft 216 which may be made of suitable material having good magnetic qualities. The excitation coils 225 and 226 are of pancaked, ring-like configuration and are each wound concentrically with respect to the axis of their central apertures. The coils are each energized from suitable external direct current source at the sets of terminals 230 and 231 in such polarity as to effect clockwise direction of current flow in one coil and a counterclockwise direction in the other coil. This arrangement is necessary to establish a magnetic polar relation between the cylinder 223 as one pole and the shaft 216 as the other pole. Alternative inductor and brush contact arrangements are provided for this modification. The inductor structure is generically identified in Figure 9 as a member 238 while the brush contact is denoted by member 241 which consists of a conductive fluid filling the remaining volume of chamber 250 between the inductor and the confines defined by member 211, shaft 216, and sleeve 217.

Figure 10 shows one inductor and brush contact arrangement which consists of fluid propelling paddles 242 which are integral with an insulating sleeve 217' which is keyed at 218' to shaft 216'. A conductive fluid fills the remainder of chamber 250. In this arrangement the fluid serves both as inductor and brush contact means, the brush contact portion thereof constituting the surface contact areas between the fluid and the inner surfaces of current collectors 212 and 213. Figure 11 shows another inductor and brush contact arrangement consisting of a copper cylinder 243 which has an insulated sleeve 217" bonded at 252 in the central bore thereof. The sleeve is keyed at 218" to shaft 216". A conductive fluid fills the remainder of chamber 250' which serves as a fluid brush electrically connecting the ends of cylinder 243 to the respective inner surfaces of collectors 212 and 213.

Figure 12 shows an alternative arrangement of the magnetic structure arrangement for the device shown in Figure 1. In order to accommodate greater driving torques on the shaft 216 of Figure 9 and the use of materials having better magnetic qualities, hence generally softer materials, the shaft 216 has disposed thereon in interlocking arrangement a sleeve 251 of suitable magnetic material. The interrelation of the remaining parts with the sleeve 251 is the same as that for those parts relative to shaft 216 in Figure 9.

All embodiments of the modification shown in Figure 9 have mounting lugs similar to 47 in Figure 2.

Although the description of each modification has been in terms of generator performance it is apparent, as previously stated, that simple electrical and mechanical changes would adapt each modification for operation as a motor. The change from generator to motor operation is easily effected by the application of a suitable voltage to the terminals of each modification previously identified as generator terminals. Obviously both the field excitation voltage and the input voltage are the same, either alternating current or direct current, depending upon the desired mode of operation. With these simple changes made the shafts previously described as generator shafts become driven shafts capable of providing mechanical drive for usual motor applications.

An important feature of the alternating current embodiments of the generators shown in Figures 1, 6 and 11 is the faithful reproduction of the frequency of the excitation voltage in the output voltage regardless of any variations in the speed at which the inductor is rotated. These modifications, therefore, have further utility as means for controlling output voltage frequency where variable generator driving speeds are encountered or as means for maintaining output within close tolerances the frequency of the output voltage. For it is obvious that if a relatively small stable frequency alternating current voltage is supplied to the field coils the frequency of the large generator output voltage can be maintained the same as the frequency of the field. Devices having these qualities have usefulness in public utility or private electrical power generation and general aircraft power systems where frequency stability is of prime consideration; and in various applications such as elevator power systems and electrical vibrator devices where controlled variations of frequency are required.

The foregoing description of the principle of this invention and certain modes of its application is to be construed as illustrative only, other changes in the shape, size and arrangements of parts may be employed without departure from the true scope of the invention as further defined in the appended claims.

Having thus described my invention, I claim:

1. A rotary electromagnetic device comprising means for producing a magnetic field; a housing having a hollow annular interior cavity permeated by said field and disposed about a central axis; an electrically conductive fluid within the hollow interior of said housing, means in said annular interior cavity for circulating said fluid within said annular cavity and about said central axis; and means for connecting opposed surfaces of said fluid to an external electric circuit whereby currents induced in said conductive fluid by movement of said fluid in said field may be applied to a load; said fluid circulating means comprising a rotatable shaft; and said housing being sealingly mounted on said shaft with the annular cavity thereof coaxially related to said shaft.

2. A rotary electromagnetic device comprising means for producing a magnetic field; a housing having a hollow annular interior cavity permeated by said field and disposed about a central axis; an electrically conductive fluid within the hollow interior of said housing, means for circulating said fluid within said annular cavity about said central axis perpendicular to said field; and means for connecting opposed surfaces of said fluid to an external electric circuit whereby currents induced in said conductive fluid by movement of said fluid in said field may be applied to a load; said fluid circulating means comprising a rotatable shaft rotatable with respect to the housing; said housing being sealingly mounted on said shaft; said fluid circulating means further comprising at least one paddle fixed to said shaft, said paddle being disposed within said annular cavity whereby said paddle circulates fluid through said annular cavity upon rotation of said shaft.

3. A rotary electromagnetic device comprising means for producing a magnetic field; a housing having a hollow annular interior cavity permeated by said field and disposed about a central axis; an electrically conductive fluid within the hollow interior of said housing, means for circulating said fluid within said annular cavity and about said central axis perpendicular to said field; and means for connecting opposed surfaces of said fluid to an external electric circuit whereby currents induced in said conductive fluid by movement of said fluid in said field may be applied to a load; said fluid circulating means comprising a rotatable shaft rotatable with respect to the housing; said housing being sealingly mounted on said shaft; said fluid circulating means further comprising at least one paddle fixed to said shaft and extending radially therefrom, said paddle being disposed within said annular cavity whereby said paddle circulates the fluid through said annular cavity upon rotation of said shaft; said means for connecting opposed surfaces of said fluid to an external electric circuit comprising conductive surface areas within said annular cavity.

4. A rotary electromagnetic device comprising means for producing a magnetic field; a housing having a hollow annular interior cavity permeated by said field; said annular cavity being disposed with the axis thereof perpendicular to the direction of said field; an electrically conductive fluid within the hollow interior of said housing, means for circulating said fluid within said annular cavity; and means for connecting opposed surfaces of said fluid to an external electric circuit; said fluid circulating means comprising rotatable shaft rotatable with respect to the housing; said housing being sealingly mounted on said shaft; said fluid circulating means further comprising at least one paddle fixed to said shaft and extending radially therefrom, said paddle being disposed within said annular cavity whereby said paddle circulates the fluid through said annular cavity upon rotation of said shaft; said shaft being formed of conductive material; and said means for connecting opposed surfaces of said fluid to an external electric circuit comprising a conductive surface within said annular cavity and of said conductive shaft.

5. A rotary electromagnetic device comprising means for producing a magnetic field; a housing having a hollow annular interior cavity permeated by said field and disposed about a central axis; an electrically conductive fluid within the hollow interior of said housing, means for circulating said fluid within said annular cavity and about said central axis; and means for connecting opposed surfaces of said fluid to an external electric circuit whereby currents induced in said conductive fluid by movement of said fluid in said field may be applied to a load; said fluid circulating means comprising rotatable shaft rotatable with respect to the housing; said housing being sealingly mounted on said shaft; said fluid circulating means further comprising at least one paddle fixed to said shaft and extending radially therefrom, said paddle being disposed within said annular cavity whereby said paddle circulates the fluid through said annular cavity upon rotation of said shaft; the direction of said magnetic field through said annular cavity being radial with respect to said shaft.

6. A rotary electromagnetic electric generator comprising a housing, a body of electrically conductive fluid sealed in said housing, propelling means engaging said fluid for causing said fluid to flow in a continuous annular path, terminal means in electrical contact with said fluid, stationary means for producing an alternating magnetic field wherein the lines of force thereof pass perpendicularly through all portions of said annular path, whereby an alternating electromative force is induced in the conductive fluid of the same frequency as that of said alternating magnetic field regardless of the speed at which said fluid is propelled.

References Cited in the file of this patent

UNITED STATES PATENTS

| | | |
|---|---|---|
| 1,184,224 | Breslauer | May 23, 1916 |
| 1,196,511 | Borger | Aug. 29, 1916 |
| 1,973,019 | Shore | Sept. 11, 1934 |
| 1,987,479 | Japolsky | Jan. 8, 1935 |
| 2,652,778 | Crever | Sept. 22, 1953 |
| 2,753,469 | Statham et al. | July 3, 1956 |